(12) United States Patent
Spinelli et al.

(10) Patent No.: US 7,905,589 B2
(45) Date of Patent: Mar. 15, 2011

(54) INKJET PRINTING WITH PIGMENTED INKS

(75) Inventors: Harry Joseph Spinelli, Wilmington, DE (US); Richard Douglas Bauer, Kennett Square, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 888 days.

(21) Appl. No.: 11/116,927

(22) Filed: Apr. 28, 2005

(65) Prior Publication Data

US 2005/0253911 A1 Nov. 17, 2005

Related U.S. Application Data

(60) Provisional application No. 60/570,544, filed on May 13, 2004.

(51) Int. Cl.
*C09D 11/00* (2006.01)

(52) U.S. Cl. .......................................... 347/100; 347/101

(58) Field of Classification Search .................. 347/100, 347/101
See application file for complete search history.

(56) References Cited

U.S. PATENT DOCUMENTS

| | | |
|---|---|---|
| 5,085,698 A | 2/1992 | Ma et al. |
| 5,231,131 A | 7/1993 | Chu et al. |
| 6,364,452 B1 * | 4/2002 | Noyes et al. .................... 347/43 |
| 6,426,014 B1 | 7/2002 | Silverbrook |
| 6,443,555 B1 | 9/2002 | Silverbrook et al. |
| 6,626,531 B2 * | 9/2003 | Fujii et al. ..................... 347/105 |
| 6,852,156 B2 | 2/2005 | Yeh et al. |
| 6,857,733 B2 | 2/2005 | Issler |
| 7,121,660 B2 | 10/2006 | Ide et al. |
| 2002/0033863 A1 | 3/2002 | Silverbrook |
| 2002/0044187 A1* | 4/2002 | Koitabashi et al. ........... 347/101 |
| 2003/0160850 A1* | 8/2003 | Ohya et al. .................... 347/101 |

FOREIGN PATENT DOCUMENTS

| | | |
|---|---|---|
| EP | 0 556 649 B1 | 6/1999 |
| EP | 1 167 046 A1 | 1/2002 |
| EP | 1 391 301 A1 | 2/2004 |
| EP | 1391301 A1 * | 2/2004 |

OTHER PUBLICATIONS

International Search Report.
BYK Additives and Instruments Gloos/Appearance|Color|Physical Testing, 2009 QC Solutions for coatings and plastics, p. 36.

* cited by examiner

*Primary Examiner* — Manish S Shah
*Assistant Examiner* — Laura E Martin
(74) *Attorney, Agent, or Firm* — Simon L. Xu

(57) ABSTRACT

Method for printing high gloss, high DOI (distinctness of image) images with pigmented inkjet inks. The method comprises printing the pigmented inks in one pass onto absorbent glossy media.

15 Claims, No Drawings

INKJET PRINTING WITH PIGMENTED INKS

CROSS-REFERENCE TO RELATED APPLICATIONS

This application claims priority under 35 U.S.C. §119 from U.S. Provisional Application Ser. No. 60/570,544 (filed May 13, 2004), the disclosure of which is incorporated by reference herein for all purposes as if fully set forth.

BACKGROUND OF THE INVENTION

This invention pertains to an inkjet printing method for achieving high gloss and DOI with pigmented inkjet inks.

Inkjet printing is a non-impact printing process in which droplets of ink are deposited on print media, such as paper, to form the desired image. The droplets are ejected from a printhead in response to electrical signals generated by a microprocessor. Inks used in such recording are subject to rigorous demands including, for example, good dispersion stability, ejection stability, and good fixation to media.

Inkjet printers offer low cost, high quality printing and have become a popular alternative to other types of printers such as laser printers. The resolution of current generation Inkjet printers is so good that they are also replacing many of the traditional photographic printing techniques.

Both dyes and pigments have been used as colorants for inkjet inks. While dyes are typically easy to formulate and offer vivid color, they tend to fade quickly and lack water fastness. Pigments offer good light-fastness and good color, under proper conditions, but the formulation and application of pigment inks is challenging.

The fade-resistant properties of pigments is particularly advantageous for photographic or "photo quality" prints. These types of prints are often expected to last many years and are exposed to long periods of direct light.

The present generation of photo quality printers typically employs scanning printheads. With this type of printing, the printhead can, and usually does, pass over the same area many times, interlacing the drops of ink. Also, in scanning, printheads can achieve higher resolution than would otherwise be possible. Thus a printhead may have nozzles spaced at 180 dpi (180 "native" dpi) but by microstepping the media and making four passes, an apparent resolution of 720 can be achieved.

High Gloss and Distinctness of Image (DOI) are desirable attributes of photo quality images. These attributes are largely influenced by the choice of media, but also playing a role is the choice of ink. Generally, lower gloss and DOI is attained with pigments inks than with dye inks.

The problem of low gloss with pigment inks is noted, for instance, in U.S. Pat. No. 6,857,733, the disclosure of which is incorporated by reference herein for all purposes as if fully set forth. That art is directed to achieving uniform gloss, not necessarily high gloss.

There is still a need for a method of creating high gloss, high DOI inkjet prints with pigment inks.

SUMMARY OF THE INVENTION

In accordance with one aspect of the present invention, there is provided a method for inkjet printing onto a substrate, comprising the steps of:

(a) providing an inkjet printer that is responsive to digital data signals;
(b) loading the printer with a substrate to be printed;
(c) loading the printer with an inkjet ink; and
(d) printing onto the substrate using the inkjet ink in response to the digital data signals,
wherein the substrate is an absorbent glossy media, the inkjet ink is a pigmented inkjet ink, printing is accomplished in one pass, and the printer is equipped with a printhead arrangement that allows substantially all the ink to be jetted for a given area of the substrate to be laid down in one pass.

Preferably, in the above process, the printing is accomplished at a resolution of at least 600 dpi; and/or the printhead arrangement prints at a drop size that is equal to or less than about 10 pL; and/or the printer is loaded with an inkjet ink set comprising at least a cyan, magenta and yellow ink; and/or the linear scan speed is at least 6 cm/sec; and/or the printhead arrangement operates by scanning across the media, or the printhead arrangement is a fixed array; and/or the 60 degree gloss of the unprinted media is at least about 30 gloss units; and/or ink set further comprises a colorless ink which is applied in the uncolored area to substantially equalized gloss across the full tonal range of the image; and/or the 60 degree gloss of an area printed at or about 100% coverage is at least about 60 gloss units; and/or the DOI of an area printed at or about 100% coverage is at least about 1.50 DOI; and/or the gloss of an image, printed at 100% coverage, has substantially the same gloss as the unprinted media.

These and other features and advantages of the present invention will be more readily understood by those of ordinary skill in the art from a reading of the following detailed description. It is to be appreciated that certain features of the invention which are, for clarity, described above and below in the context of separate embodiments, may also be provided in combination in a single embodiment. Conversely, various features of the invention that are, for brevity, described in the context of a single embodiment, may also be provided separately or in any subcombination. In addition, references in the singular may also include the plural (for example, "a" and "an" may refer to one, or one or more) unless the context specifically states otherwise. Further, reference to values stated in ranges include each and every value within that range.

DETAILED DESCRIPTION OF THE PREFERRED EMBODIMENTS

Media

The substrate suitable for use in the present invention is absorbent and glossy. By "absorbent" it is meant that the media can handle the ink load applied without running, and that the media dries rapidly so that it can be handled soon after printing. By "glossy" it is meant that the media allows a printed image to have good gloss, but does not necessarily mean that the media itself, unprinted, is highly glossy. Preferably, the unprinted media has a 60 degree gloss of at least about 30 gloss units. The more distinct the surface reflection, the more brilliant the gloss appears and, therefore, the unprinted media preferably has good DOI, and more preferably at least about 1.5.

Two types of media that can be both absorbent and glossy are known as "microporous" and "hybrid" media. The so-called microporous media generally has a coating of absorbent particles on the surface that allow quick absorption of ink vehicle. So-called hybrid media typically has a coating of absorbent particles and polymer to provide absorbency and higher gloss. Straight "polymer coated" media, although generally quite glossy, tends to be slow to dry—generally too slow for use in the present invention. So-called "plain paper", although adequately absorbent, will not be useful in this invention as it does not allow glossy prints. Some commercially available absorbent, glossy media include, for example, Epson SO41286 and SO41141, and Hewlett Packard include, for example, Epson SO41286 and SO41141, and Hewlett Packard Photo Paper Glossy C7890A.

Printer

The printer is equipped with a printhead arrangement that allows substantially all the ink to be jetted for a given area of a substrate to be laid down in one pass (single pass). A suitable arrangement can be a scanning head or a fixed array.

In a scanning head, the printhead scans across the page printing a swath of ink; the page is then advanced so the next swath can be printed. As prescribed by the present invention, each swath printed by a scanning printhead will be complete without further scans over the same area. There is substantially no overlap between swaths, although from a practical standpoint, there may be slight overlap, perhaps the width of one or two nozzles, where the swaths abut. One scan represents the passage of the printhead across the page one time ("one pass"). Printing can be performed in one direction only, for example, printing a swath on the outbound scan only with no printing on the return scan. Alternatively, printing can occur in both directions by printing one swath on the outbound scan and the next swath on the return scan.

Most if not all the photo quality printers available today employ scanning printheads. These printers can be adapted for use in the present invention by equipping them with nozzle configurations that allow native print resolution of at least 300 dpi, more preferably at least 600 dpi, and by modifying the print driver to allow printing in one pass.

Another type of inkjet printer suitable for use in the present invention is one equipped with a printhead array that is fixed in position (fixed array). The printer can be, for example, similar to that described in U.S. Pat. No. 6,443,555 (the disclosure of which is incorporated by reference herein for all purposes as if fully set forth). The printhead(s) for such a printer can be, for example, those described in U.S. Pat. No. 6,426,014 and US20020033863 (the disclosures of which are also incorporated by reference herein for all purposes as if fully set forth).

The fixed array printhead is configured with enough nozzles to achieve the given dpi in one pass of the substrate through the print zone. The width of the printing zone is at least as wide as the width of the area to be printed. Accordingly, printheads of this sort are commonly referred to as page-wide arrays or full-width arrays. For so-called "SOHO" (small office, home office) and "network" printing, the width of the printing zone is at least as wide as standard papers, such as A4 size paper and/or letter size (8.5×11 inch) paper. For so-called "wide-format" printing, the print zone is preferably at least about 24 inches wide and can accommodate media that is fed from a roll.

The drops, or dots per inch (dpi), refers to the number of ink drops per square inch of media for full (100%) coverage. The dpi is preferably at least 300 dpi, and more preferably at least 600 dpi. Even more preferably the dpi is at least 720, and can be higher.

Drop volume is preferably less than about 20 pL, more preferably less than about 10 pL, still more preferably less than about 5 pL, and even more preferably less than about 2 pL.

Linear scan speed refers to the relative motion of the media past the printhead arrangement. In the case of a scanning printhead, it is the speed at which the printhead moves across the page; in the case of a fixed array, it is the linear feed rate of the media. Preferably the linear scan speed is at least about 6 cm/sec, more preferably at least about 15 cm/sec, and still more preferably at least about 25 cm/sec.

Pigment Inks and Ink Set

Pigment inks comprise a vehicle and insoluble (pigment) colorant, and may further comprise other ingredients as are generally well known to those of ordinary skill in the art. Suitable inks include commercially available inks such as those in Epson Stylus C84, Epson Stylus Photo 2200 and the Hewlett Packard DesignJet Large Format Series (UV inks).

Vehicle

The vehicle is preferably an "aqueous vehicle" by which is meant water or a mixture of water and at least one water-soluble organic solvent (co-solvent). Selection of a suitable mixture depends on requirements of the specific application, such as desired surface tension and viscosity, the selected colorant, drying time of the ink, and the type of substrate onto which the ink will be printed. Representative examples of water-soluble organic solvents that may be selected are disclosed in U.S. Pat. No. 5,085,698 (the disclosure of which is incorporated by reference herein for all purposes as if fully set forth).

If a mixture of water and a water-soluble solvent is used, the aqueous vehicle typically will contain about 30% to about 95% water with the balance (i.e., about 70% to about 5%) being the water-soluble solvent. Preferred compositions contain about 60% to about 95% water, based on the total weight of the aqueous vehicle.

The amount of aqueous vehicle in the ink is typically in the range of about 70% to about 99.8%, and preferably about 80% to about 99.8%, based on total weight of the ink.

Inks based on aqueous vehicles can be made to be fast penetrating (rapid drying) by including surfactants or penetrating agents such as glycol ethers and 1,2-alkanediols. Glycol ethers include ethylene glycol monobutyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, and dipropylene glycol mono-isopropyl ether. 1,2-Alkanediols are preferably 1,2-C4-6 alkanediols, most preferably 1,2-hexanediol. Suitable surfactants include ethoxylated acetylene diols (e.g. Surfynols® series from Air Products), ethoxylated primary (e.g. Neodol® series from Shell) and secondary (e.g. Tergitol® series from Union Carbide) alcohols, sulfosuccinates (e.g. Aerosol® series from Cytec), organosilicones (e.g. Silwet® series from Witco) and fluoro surfactants (e.g. Zonyl® series from DuPont).

The amount of glycol ether(s) and 1,2-alkanediol(s) added must be properly determined, but is typically in the range of from about 1 to about 15% by weight and more typically about 2 to about 10% by weight, based on the total weight of the ink. Surfactants may be used, typically in the amount of about 0.01 to about 5% and preferably about 0.2 to about 2%, based on the total weight of the ink.

Pigment Colorant

Pigments, traditionally, are stabilized to dispersion in a vehicle by dispersing agents, such as polymeric dispersants or surfactants. More recently though, so-called "self-dispersible" or "self-dispersing" pigments (hereafter "SDP") have been developed. As the name would imply, SDPs are dispersible in water, or aqueous vehicle, without dispersants. The black pigment may be stabilized to dispersion by surface treatment to be self-dispersing (see, for example, U.S. Pat.

No. 6,852,156, the disclosure of which is incorporated by reference herein for all purposes as if fully set forth), by treatment with dispersant in the traditional way, or by some combination of surface treatment and dispersant.

Preferably, when dispersant is employed, the dispersant(s) is a random or structured polymeric dispersant. Preferred random polymers include acrylic polymer and styrene-acrylic polymers. Most preferred are structured dispersants which include AB, BAB and ABC block copolymers, branched polymers and graft polymers. Some useful structured polymers are disclosed in U.S. Pat. No. 5,085,698, EP-A-0556649 and U.S. Pat. No. 5,231,131 (the disclosures of which are incorporated by reference herein for all purposes as if fully set forth).

Useful pigment particle size is typically in the range of from about 0.005 micron to about 15 micron. Preferably, the pigment particle size should range from about 0.005 to about 5 micron, more preferably from about 0.005 to about 1 micron, and most preferably from about 0.005 to about 0.3 micron.

Useful pigments include, for example, (cyan) Pigment Blue 15:3 and 15:4; (magenta) Pigment Red 122; (yellow) Pigment Yellow 128, Pigment Yellow 95, Pigment Yellow 155 and Pigment Yellow 74; and (black) carbon black.

Other Ink Ingredients

Other ingredients may be formulated into the inkjet ink, to the extent that such other ingredients do not interfere with the stability and jetablity of the ink, which may be readily determined by routine experimentation. Such other ingredients are in a general sense well known in the art.

Polymer additives may also be included in the ink. The polymers can be soluble in the vehicle or dispersed (e.g. "emulsion polymer" or "latex"), and can be ionic or nonionic. Useful classes of polymers include acrylics, styrene-acrylics and polyurethanes.

Biocides may be used to inhibit growth of microorganisms.

Inclusion of sequestering (or chelating) agents such as ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanediaminetetraacetic acid (CyDTA), dethylenetriamine-N,N,N',N", N"-pentaacetic acid (DTPA), and glycoletherdiamine-N,N,N',N'-tetraacetic acid (GEDTA), and salts thereof, may be advantageous, for example, to eliminate deleterious effects of heavy metal impurities.

Ink Properties

Drop velocity, separation length of the droplets, drop size and stream stability are greatly affected by the surface tension and the viscosity of the ink. Ink jet inks typically have a surface tension in the range of about 20 dyne/cm to about 70 dyne/cm at 25° C. Viscosity can be as high as 30 cP at 25° C., but is typically somewhat lower, more typically in the range of from about 1 to about 20 cps. The ink has physical properties that are adjusted to the ejecting conditions and printhead design. The inks should have excellent storage stability for long periods so as not clog to a significant extent in an ink jet apparatus. Further, the ink should not corrode parts of the inkjet printing device it comes in contact with, and it should be essentially odorless and non-toxic. The inks are particularly suited for drop-on-demand inkjet printheads, especially thermal and piezo printheads.

Proportions of Ingredients

The components described herein can be combined in various proportions and combinations to make an ink with the desired ink properties, as generally described above, and as otherwise generally recognized by those of ordinary skill in the art. Some experimentation may be necessary to optimize inks for a particular end use, but such optimization is generally within the ordinary skill in the art.

For example, the amount of vehicle in an ink is typically in the range of about 70% to about 99.8%, and preferably about 80% to about 99.8%, by weight based on total weight of the ink.

Pigment colorant will generally be present in amounts up to about 12%, and more typically in the range of about 1.0 to about 9%, by weight of the total ink.

Dispersants, when needed for stabilization of an insoluble colorant, are employed at levels based on the amount of colorant and are usually expressed as a weight ratio. Generally, dispersants are employed at a pigment-to-dispersant weight ratio in the range of about 1:3 to about 4:1.

Other ingredients (additives), when present, generally comprise less than about 15% by weight, based on the total weight of the ink. Surfactants, when added, are generally in the range of about 0.2 to about 3% by weight based on the total weight of the ink. Polymers can be added as needed, but will generally be less than about 15% by weight based on the total weight of the ink.

Ink Sets

The ink sets in accordance with the present invention comprise at least three differently colored pigment inks (such as CMY), and preferably at least four differently colored inks (such as CMYK). The ink set may further comprise one or more "gamut-expanding" inks, including different colored inks such as an orange ink, a green ink, a red ink and/or a blue ink, and combinations of full strength and light strengths inks such as light cyan and light magenta.

In one emodiment, one or more colored pigment inks in an ink set comprises at least 2.5% pigment based on the total weight of ink. In another embodiment, an ink set comprises a cyan ink comprising at least 2.0% pigment by weight, and a magenta and yellow ink each comprising at least 2.5% pigment by weight based on the total weight of ink.

Additional Printing Methods

The ink set can further include a colorless ink. The colorless ink can be applied (concurrently or consecutively) in areas of the printed image not covered by the colored inks to substantially equalize gloss over the full tonal range of the image as disclosed in previously incorporated U.S. Pat. No. 6,857,733. The colorless ink can also be applied over the colored ink(s) as an overcoat to improve properties of the printed image, such as durability.

EXAMPLES

This invention now will be further illustrated, but not limited, by the following examples.

Printing Tests

Unless otherwise indicated, printing was performed on a printing apparatus consisting of two Epson 850 piezoelectric ink-jet printheads mounted in fixed position above a rotating drum to which the media was attached. The two printheads were aligned to print on the same area of the substrate and there was a fixed gap between them so that the time interval between printing of the two fluids was controlled by the drum speed which could be varied as needed to provide the desired interval. The printheads were approximately 1 cm wide and produced a stripe of the same width. Drop size could be varied by altering the piezoelectric element drive signal. The drum direction was reversed, when needed, to change the order of printing of the two fluids. The two printheads were staggered to provide 700 dpi resolution. All printing was done at 100% coverage unless otherwise specified.

For comparison, some prints were made with an Epson 980 (1440 dpi, photo mode). The printing was multipass, but the exact print algorithm was not known.

Media used for all tests was Epson S041286 Glossy Media. The 60 degree gloss was 32 and the DOI was 2.24.

Optical density was measured with a Greytag-MacBeth Spectropotometer.

Gloss was measured with a Byk-Gardner micro-TRI-gloss meter.

DOI was measured on a BYK-Gardner Wave Scan DOI.
Polymer 1 (Random linear polymer of BZMA/MM 92/8)

Polymer 1 was prepared as follows. A 5-liter flask was equipped with a mechanical stirrer, thermometer, nitrogen inlet, drying tube outlet and addition funnels. 1715.1 g of tetrahydrofuran (THF) was charged to the flask, followed by 1.2 ml of a 1.0 M solution of a catalyst (tetrabutyl ammonium m-chlorobenzoate) in acetonitrile. 51.33 g of an initiator (0.295M, 1-methoxy-1-trimethylsiloxy-2-methyl propene was injected, then Feed I (tetrabutyl ammonium m-chlorobenzoate, 1.2 ml of a 1.0 M solution in acetonitrile and THF, 10.0 g) was started and added over 180 minutes. Feed II (trimethylsilyl methacrylate, 213.2 g (1.69 M) and benzyl methacrylate, 1334.5 g (7.42 M)) was started at 0.0 minutes and added over 70 minutes. At 173 minutes, 60.5 g of methanol was added to the above solution and distillation begun. During the first stage of distillation, 503.0 g of material was removed. The final polymer was at 51.7 wt % solids. The polymer had a composition of BZMA/MM 92/8 and a molecular weight (Mn) of 5047.
Polymer 2 (ETEGMA//BZMA//MM 3.6/113.61110.8)

Polymer 2 was prepared as follows. A 3-liter flask was equipped with a mechanical stirrer, thermometer, nitrogen inlet, drying tube outlet and addition funnels. 291.3 g of THF was charged to the flask, followed by 0.44 ml of a 1.0 M solution of a catalyst (tetrabutyl ammonium m-chlorobenzoate) in acetonitrile. 20.46 g of an initiator (0.0882 M, 1,1-bis(trimethylsiloxy)-2-methyl propene) was injected, then Feed I (tetrabutyl ammonium m-chlorobenzoate, 0.33 ml of a 1.0 M solution in acetonitrile and THF, 16.92 g) was started and added over 185 minutes. Feed II (trimethylsilyl methacrylate, 152.00 g (0.962 M)) was started at 0.0 minutes and added over 45 minutes. One hundred and eighty minutes after Feed II was completed (over 99% of the monomers had reacted), Feed IIII (benzyl methacrylate, 211.63 g (1.20 M)) was started and added over 30 minutes. Forty minutes after Feed III was completed (over 99% of the monomers had reacted), Feed IV (ethoxytriethyleneglycol methacrylate, 78.9 g (0.321 M)) was started and added over 30 minutes. At 400 minutes, 73.0 g of methanol and 111.0 g of 2-pyrrolidone were added to the above solution and distillation begun. During the first stage of distillation, 352.0 g of material was removed. Then, 340.3 g of 2-pyrrolidone was added, and an additional 81.0 g of material was distilled out. Finally, another 86.9 g of 2-pyrrolidone was added. The final polymer was at 40.0 wt % solids. The polymer had a composition of ETEGMA//BZMA//MM 4//12//12, and a molecular weight (Mn) of 4200.
Pigment Dispersion 1

Six hundred grams of carbon black (Nipex() 180 IQ from Degussa) was loaded into a high-speed disperser (HSD) vessel with 4400 grams of de-ionized water. The tip speed was kept at 5.5 m/sec to pre-wet the pigment for 30 minutes before the ozone treatment, then increased to 11 m/sec during the ozone treatment. Ozone was maintained at a concentration of 5.5 to 6.0 wt %, and was fed into the bottom of the HSD vessel at a flow rate of 4.5 liters per minute. Sodium hydroxide was added to the mixture in order to increase its pH to 7 after a three hour treatment. After adjusting pH, the mixture was then re-circulated through a Microfluidizer® M110 F for 5 hours. Sodium hydroxide was periodically added to the mixture to maintain a pH between 6.5 and 7.5. The product was self-dispersible without any particle sedimentation or gelation after more than 6 months of storage at room temperature. This made a dispersion with 16.2 wt % pigment concentration.
Pigment Dispersion 2

A mixture of 15.0 g Hostaperm Pink Ew-D, 14.51 g of Polymer 1 solution, 0.75 g of 45% KOH, 10.0 g of triethyleneglycol and 59.74 g of water were blended in a high speed disperser. This mixture was then charged to a Minimill 100 (Eigermachinery Inc., Bensenville, Ill., USA). Milling was carried out at 3500 RPM for an hour to generate a pigment dipsersion of 14.87 wt % pigment, with a pigment/dispersant ratio of 2/1.
Ink Preparation Inks were prepared according to the following recipes. Generally, the vehicle components were mixed separately, and then added slowly to the dispersion. Surfynol® 465 is a surfactant from Air Products (Allentown, Pa., USA). Water was deionized prior to use.

| | Ink Formulations—as % weight of total ink | | | | |
|---|---|---|---|---|---|
| | Ink 1 | Ink 2 | Ink 3 | Ink 4 | Ink 5 |
| Dispersion 1 (as % weight of pigment) | 3.0 | 3.0 | 3.0 | | |
| Dispersion 2 (as % weight of pigment) | | | | 3.0 | 6.0 |
| Polymer 1 | | 10.0 | | | |
| Polymer 2 | | | 10.0 | | |
| 1,2-Hexanediol | 4.00 | 4.00 | 4.00 | 4.00 | 4.00 |
| Glycerol | 15.00 | 15.00 | 15.00 | 15.00 | 15.00 |
| Surfynol ® 465 | 0.50 | 0.50 | 0.50 | 0.50 | 0.50 |
| Ethylene Glycol | 5.00 | 5.00 | 5.00 | 5.00 | 5.00 |
| 2-Pyrrolidone | 3.00 | 3.00 | 3.00 | 3.00 | 3.00 |
| Water (to 100%) | Bal. | Bal. | Bal. | Bal. | Bal. |

Ink 6

Epson C82 commercial magenta ink from a T0423 cartridge was used. This ink was estimated to have about 6 wt % pigment.

Example 1

The gloss of Inks 1-3 was compared for one pass printing to multi-pass printing in an Epson 980.

| | 60 Degree Gloss | |
|---|---|---|
| Ink | Epson 980 | One Pass |
| Ink 1 | 38.2 | 72.2 |
| Ink 2 | 85.1 | 103.1 |
| Ink 3 | 62.1 | 76.2 |

Results show maximum gloss with one pass printing. Higher gloss can be obtained by addition of polymer. Certain polymers seem to add more gloss than others.

Example 2

The gloss benefits of printing in one pass compared to mutiple passes is shown for Inks 4-6.

| | 60 Degree Gloss | | | |
|---|---|---|---|---|
| Ink | 1 pass | 2 pass | 3 pass | Epson 980 |
| Ink 4 | 101.6 | 79.1 | 68.5 | 82.2 |
| Ink 5 | 101.4 | 90.3 | 64.4 | 66.1 |
| Ink 6 | 62.6 | 48.5 | 32.6 | 21 |

Although there is higher gloss for all inks when printed in one pass compared to multi-pass, some inks are still glossier than others.

Example 3

The DOI for several inks and print conditions are reported in the following table. The higher the DOI value, the better quality of image.

| Ink | Print Mode | DOI | du | Wa | Wb | Wc | Wd | We |
|---|---|---|---|---|---|---|---|---|
| Ink 4 | 1 pass | 2.35 | 50.1 | 31.9 | 38.6 | 40.4 | 41.9 | 32.2 |
| Ink 4 | 2 pass | 2.09 | 53.5 | 27.5 | 25 | 27.3 | 36.2 | 39.2 |
| Ink 4 | 3 pass | 1.57 | 54.9 | 17.9 | 11.9 | 9 | 27.1 | 36.5 |
| Ink 4 | 4 pass | 1.45 | 56.4 | 16.8 | 8.6 | 6.8 | 21.5 | 34.9 |
| Ink 5 | 1 pass | 2.01 | 55.4 | 19.7 | 23.5 | 26.1 | 35.7 | 40.9 |
| Ink 5 | 2 pass | 1.52 | 58 | 15.3 | 14.2 | 12.3 | 24 | 28.5 |
| Ink 5 | 3 pass | 1.26 | 58.2 | 13 | 7.1 | 4.6 | 14.4 | 28.3 |
| Ink 5 | 4 pass | 1.08 | 59.1 | 7.7 | 3.8 | 2.1 | 8.1 | 27 |
| Ink 4 | 980 | 1.66 | 56.8 | 26.9 | 17.2 | 19.6 | 23.3 | 22.1 |
| Ink 5 | 980 | 1.18 | 58.6 | 12.4 | 5.5 | 3.4 | 12.6 | 25.2 |
| Ink 6 | 980 | 0 | — | | | (no reading, printing too dull) | | |
| Ink 6 | 1 pass | 1.67 | 51.2 | 16.9 | 20.8 | 22.6 | 30.2 | 25.1 |

Reference to "980" in print mode refers to printing on the Epson 980 printer.
DOI is calculated from (du + Wa + Wb + Wc + Wd + We)/100.

Comparative Example

For comparison, dye-based inks (Fusion® inks, DuPont Co., Wilmington, Del., USA) were printed and measured.

| Fusion Ink | 1 Pass | 2 Pass | 3 Pass | 4 Pass |
|---|---|---|---|---|
| | 60 Degree Gloss | | | |
| Cyan | 39.1 | 39.3 | 39.3 | 39.5 |
| Yellow | 42.0 | 42.0 | 41.9 | 41.2 |
| Magenta | 38.5 | 37.5 | 39.9 | 38.5 |
| | DOI Values | | | |
| Cyan | 2.872 | 2.871 | 2.871 | 2.877 |
| Yellow | 2.204 | 2.213 | 2.165 | 2.103 |
| Magenta | 2.189 | — | — | 2.158 |

As can be seen, the number of passes makes no difference with dye inks. Also, dye inks add no gloss.

The invention claimed is:

1. A method for inkjet printing onto a substrate, comprising the steps of:
    (a) providing an inkjet printer that is responsive to digital data signals;
    (b) loading the printer with a substrate to be printed;
    (c) loading the printer with an inkjet ink; and
    (d) printing onto the substrate using the inkjet ink in response to the digital data signals,
wherein the substrate is an absorbent glossy media, the inkjet ink is a pigmented inkjet ink, printing is accomplished in one pass, and the printer is equipped with a printhead arrangement that allows substantially all the ink to be jetted for a given area of the substrate to be laid down in one pass; and wherein the DOI of an area printed at 100% coverage is at least about 1.50.

2. The method of claim 1, wherein the printing is accomplished at a resolution of at least 600 dpi.

3. The method of claim 1, wherein the printhead arrangement prints a drop size that is equal to or less than about 10 pL.

4. The method of claim 1, wherein the printer is loaded with an inkjet ink set comprises at least a cyan, magenta and yellow ink.

5. The method of claim 1, wherein at least one or more pigment inks in the ink set contains at least 2.5% pigment by weight based on the total weight of ink.

6. The method of claim 4, wherein at least one or more pigment inks in the ink set contains at least 2.5% pigment by weight based on the total weight of ink.

7. The method of claim 1, wherein the linear scan speed is at least 6 cm/sec.

8. The method of claim 1, wherein the printhead operates by scanning across the media.

9. The method of claim 4, wherein the printhead operates by scanning across the media.

10. The method of claim 1, wherein the printhead arrangement is a fixed array.

11. The method of claim 4, wherein the printhead arrangement is a fixed array.

12. The method of claim 1, wherein the 60 degree gloss of the unprinted media is at least about 30 gloss units.

13. The method of claim 4, wherein the ink set further comprises a colorless ink which is applied in the uncolored area to substantially equalized gloss across the full tonal range of the image.

14. The method of claim 1, wherein the 60 degree gloss of an area printed at or about 100% coverage is at least about 60 gloss units.

15. The method of claim 1, wherein the gloss of an image, printed at 100% coverage, has substantially the same gloss as the unprinted media.

* * * * *